June 4, 1963 K. L. KIRKPATRICK 3,092,053
POWER DRIVEN HOE

Filed Nov. 4, 1959 7 Sheets-Sheet 1

INVENTOR.
KENNETH L. KIRKPATRICK
BY
ATTORNEYS

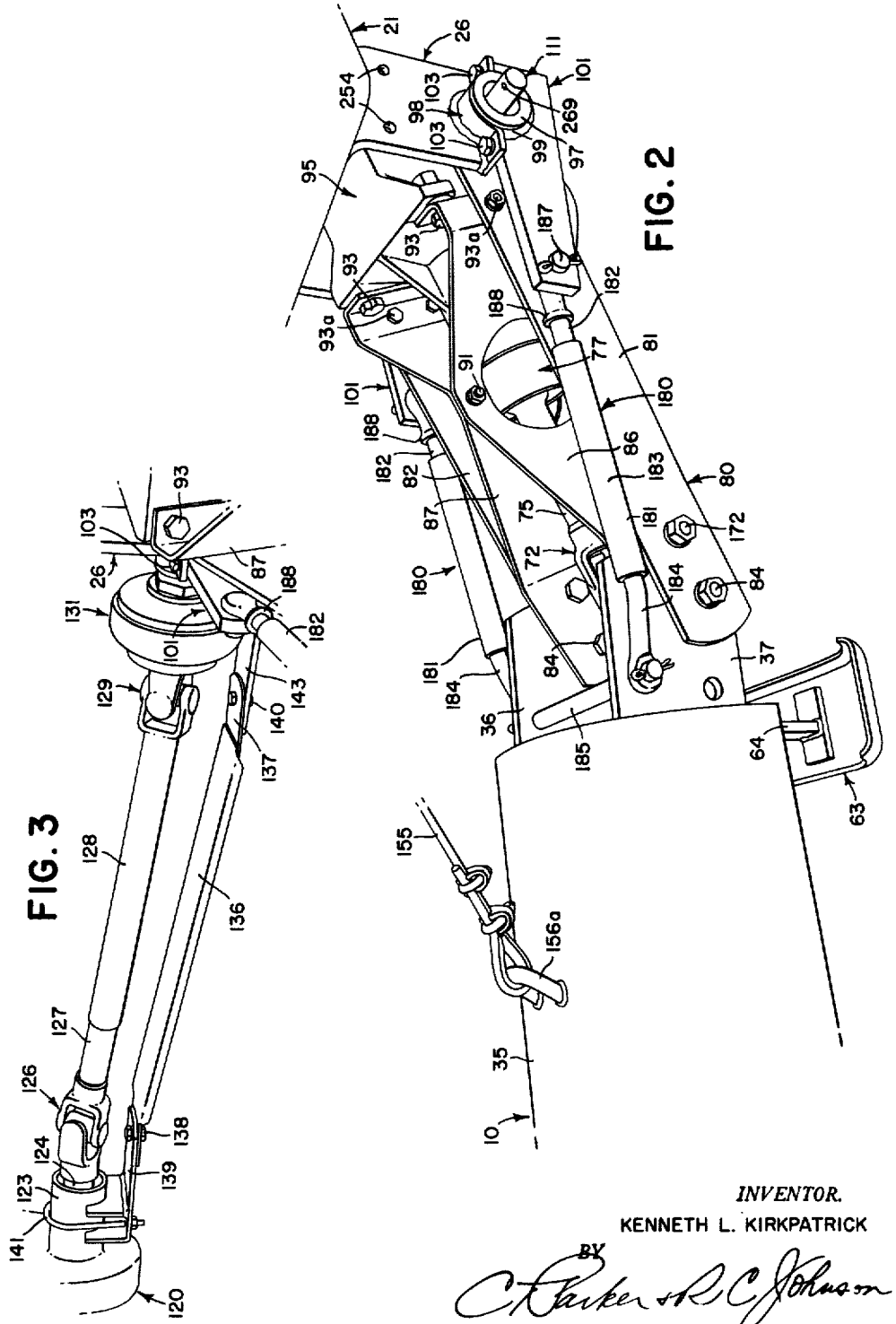

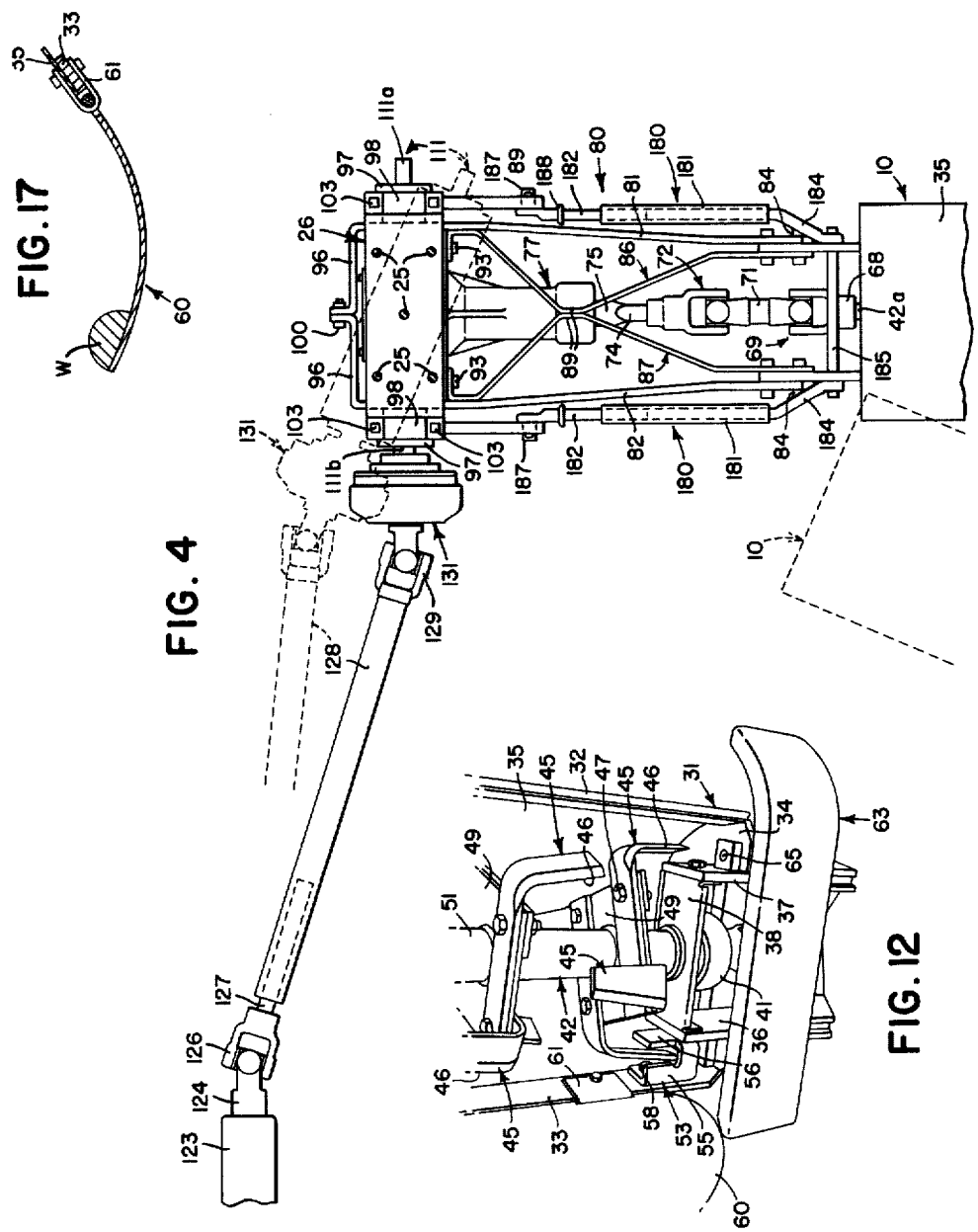

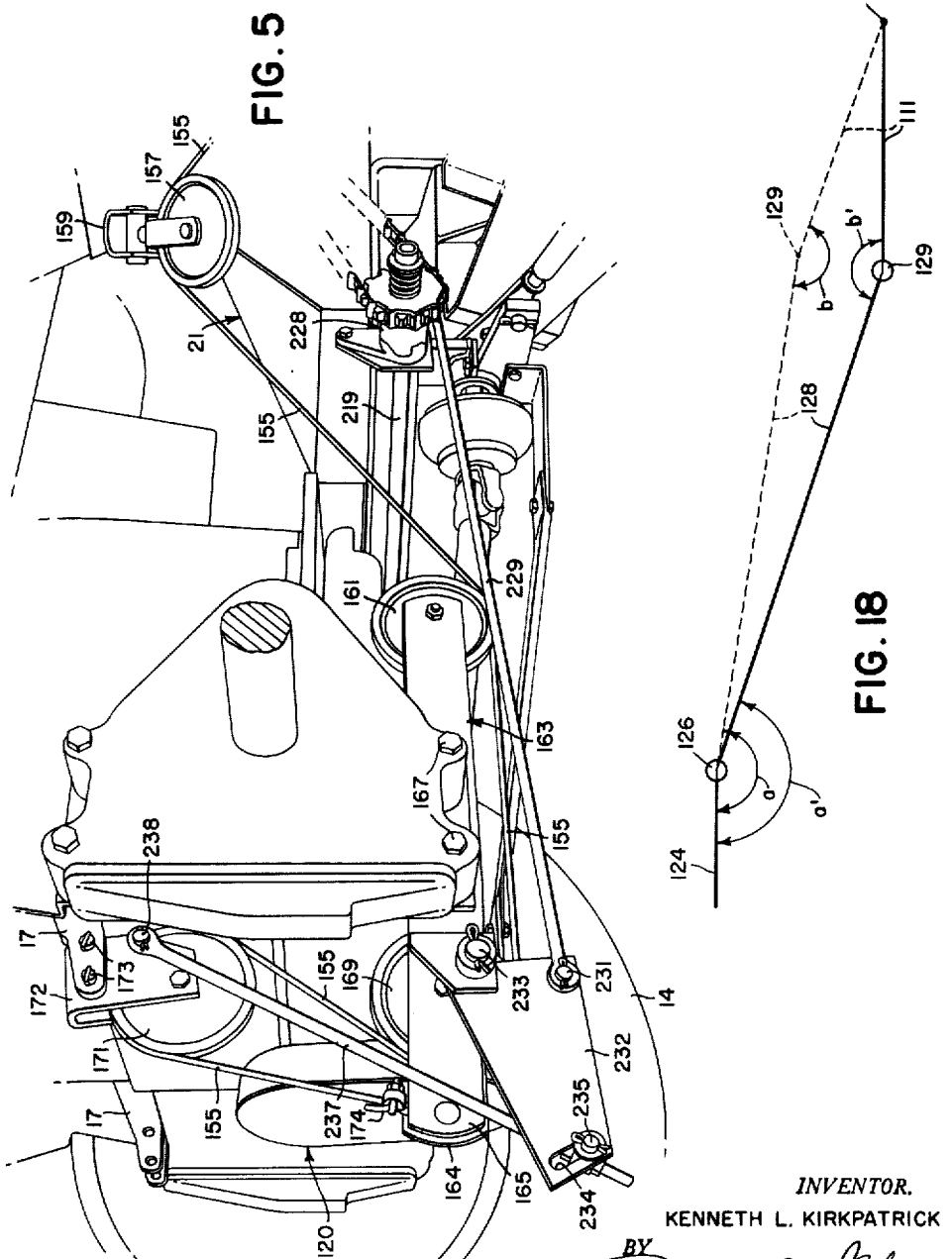

June 4, 1963 K. L. KIRKPATRICK 3,092,053
POWER DRIVEN HOE

Filed Nov. 4, 1959 7 Sheets-Sheet 5

*INVENTOR.*
KENNETH L. KIRKPATRICK

ATTORNEYS

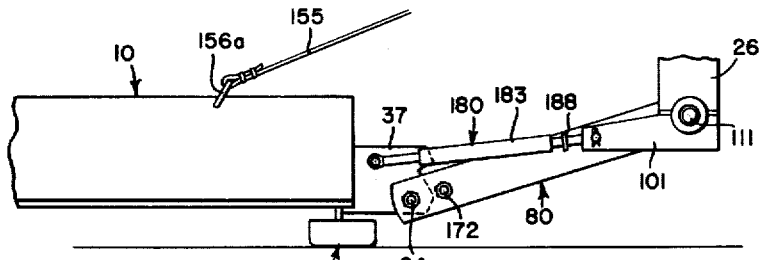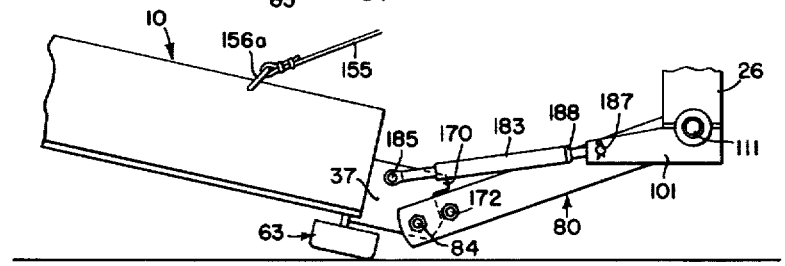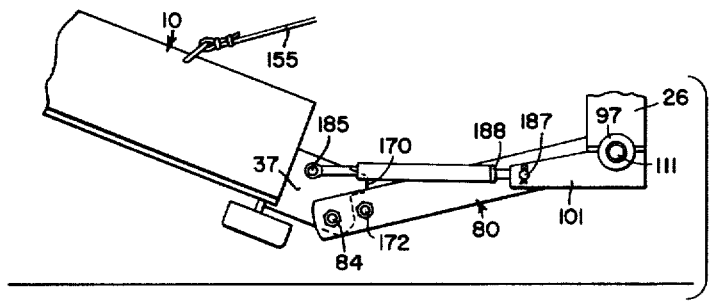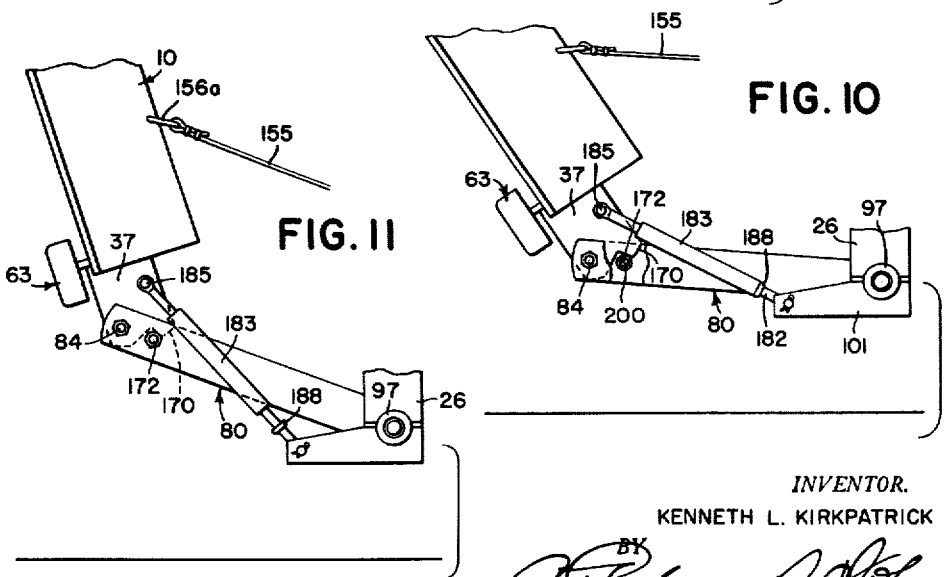

June 4, 1963  K. L. KIRKPATRICK  3,092,053
POWER DRIVEN HOE

Filed Nov. 4, 1959  7 Sheets-Sheet 7

INVENTOR.
KENNETH L. KIRKPATRICK

ATTORNEYS

United States Patent Office 3,092,053
Patented June 4, 1963

3,092,053
POWER DRIVEN HOE
Kenneth L. Kirkpatrick, Welland, Ontario, Canada, assignor to Deere & Company, Moline, Ill., a corporation of Delaware
Filed Nov. 4, 1959, Ser. No. 850,973
12 Claims. (Cl. 111—11)

This invention relates generally to argricultural implements and more particularly to tractor-carried and tractor-driven ground tilling implements of the type particularly adapted for use in the cultivation of orchards and other crops where it is desirable to cultivate areas at one side of a tractor, such as underneath overhanging tree branches, and in or around other objects and obstructions.

The object and general nature of this invention is the provision of a tractor-carried tree hoe or tiller in which the tilling unit is provided with new and improved means facilitating the disposition of the tiller head either laterally outwardly or laterally outwardly and rearwardly with respect to the tractor. A further feature of this invention is the provision of new and improved means for raising and lowering the tilling unit relative to the tractor without overloading the tractor lift mechanism, by which the tilling unit is raised, while, at the same time, securing an improved raising or lifting action which is relatively slow at first and then accelerated toward the end of the lifting cycle. Other novel features of this invention have to do with the provision of associated fertilizer distributing means that are automatically controlled when the tiller is raised and lowered and new and improved fertilizer discharging means that ensures uniform distribution across the path of travel of the tilling unit.

These and other objects and advantages of this invention will be apparent to those skilled in the art after a consideration of the following detailed description, taken in conjunction with the accompanying drawings, in which:

FIG. 1 is a fragmentary perspective view of the right side of a farm tractor and the associated portions of a laterally outwardly extending ground working unit in the form of a tree hoe or tiller, showing particularly the driving and raising connection between the tilling unit and the tractor. FIG. 1 also shows certain details of the associated fertilizer distributor and a portion of the driving means therefor.

FIG. 2 is a fragmentary perspective view, taken at a slightly larger scale relative to FIG. 1, and showing a slightly different form of means connecting the tilling unit with the tractor.

FIG. 3 is a fragmentary perspective view showing a portion of a driving connection between the power take-off means of the tractor and the tiller drive mechanism, illustrating particularly the telescoping shaft and universal joint means that accommodates disposing the tilling unit at different angles horizontally relative to the tractor and the protecting structure for the telescoping shaft and universal joint means.

FIG. 4 is a fragmentary plan view of certain portions of the drive means shown in FIG. 3 and also including certain details of the tiller connection with the tractor.

FIG. 5 is a fragmentary perspective view illustrating certain details of the lifting connections between the tilling unit and the tractor power lift parts, the right hand tractor drive wheel being removed.

FIGS. 7–11 are fragmentary elevational views, showing different stages in the raising and lowering of the tilling unit relative to the tractor.

FIG. 12 is a fragmentary perspective view, illustrating trash clearing means associated with the inner end of the tilling unit.

FIG. 17 is a sectional view of the covering or smoothing board hinged to the rear side of the rotor housing.

FIG. 18 is a diagrammatic illustration of the angular relations present in the two positions of the tiller drive mechanism.

Figure 1:
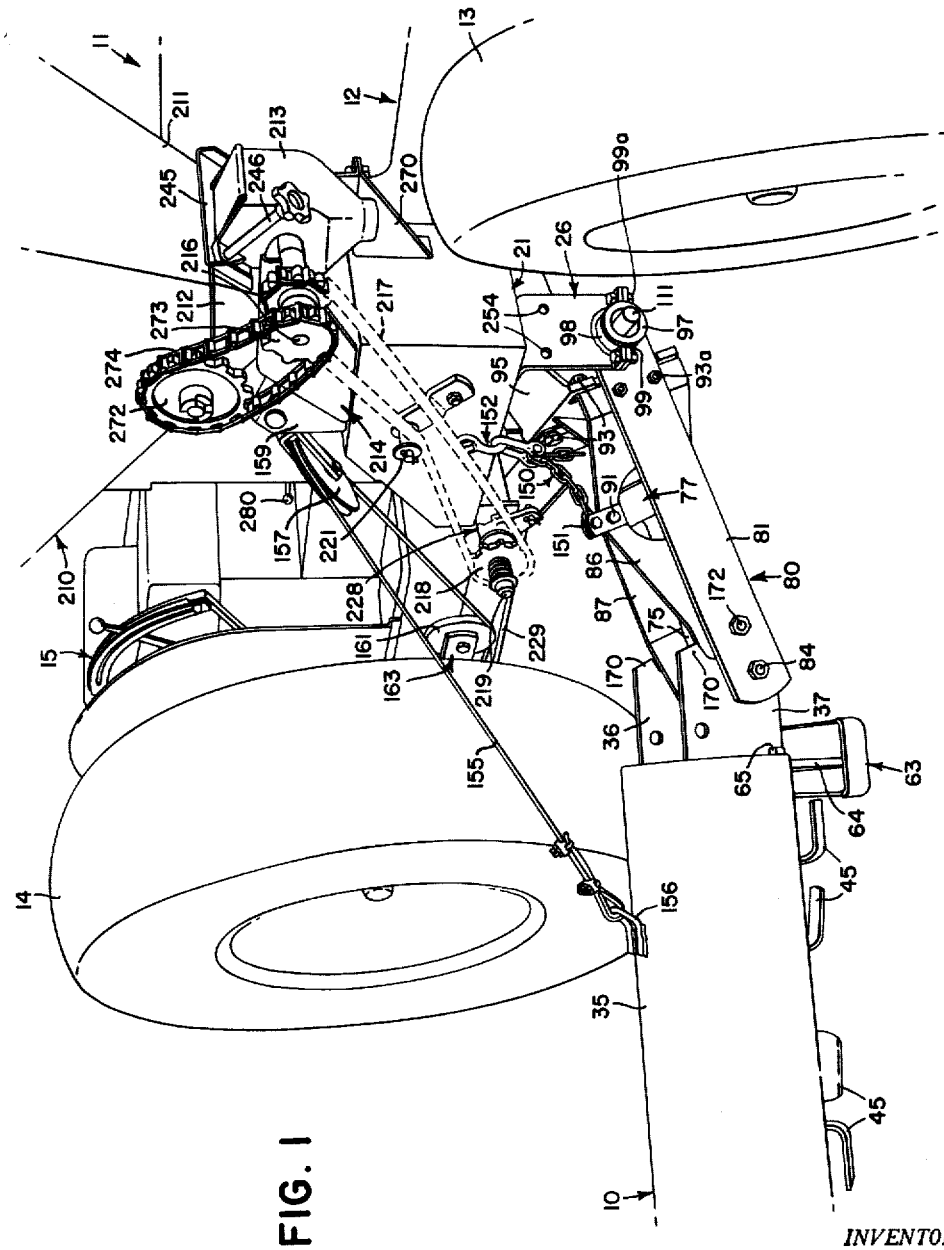
Figure 6:
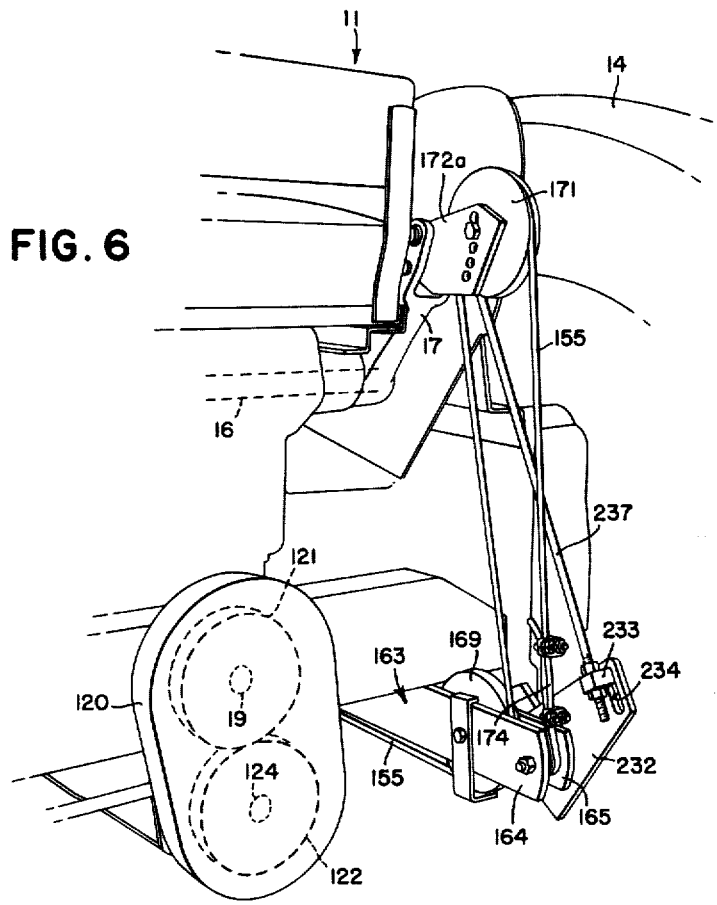
FIG. 6 is a view fragmentary in nature and showing certain features of the lift mechanism and the associated tiller-driving means associated with the power take-off of the tractor.

Referring first to FIG. 1, the power hoe or tiller of this invention is shown as embodied in a generally laterally outwardly extending tilling unit 10 connected to a tractor 11 that is generally of conventional construction, which includes frame means 12 mounted on front and rear wheels 13 and 14, the latter serving as traction or driving wheels. The tractor 11 is equipped with power lift mechanism 15, that is generally conventional so far as the present invention is concerned, and disposed transversely of the tractor and carrying lift arms 17 (FIG. 5) at the laterally outer or projecting ends is a rockshaft 16. The tractor 11 is also equipped with the usual power take-off shaft means 19 (FIG. 6) driven from the tractor engine.

For the purpose of supporting the tilling unit 10 and connecting the same with the tractor 11, the latter is provided with a supporting member 21 (best shown in FIG. 13) that preferably takes the form of a generally box-like mounting member that is fixed in any suitable way to the side of the tractor member 12. The support frame 21 includes a lower horizontal plate section 23 having a plurality of apertures 24 receiving bolt means 25 by which a U-shaped bracket 26 (FIGS. 2 and 4) may be connected to the support member in selected positions of angular adjustment in a generally horizontal plane. To this end, the plate section 23 has a sufficient number of bolt holes 24 to accommodate an angular change of about 20°. This is illustrated by way of example in FIG. 4. The support member 21 is bolted, as at 28, to the side of the tractor and the connection is reinforced by a cross brace in the form of a support angle 29 suitably fixed underneath the tractor.

Figure 14:
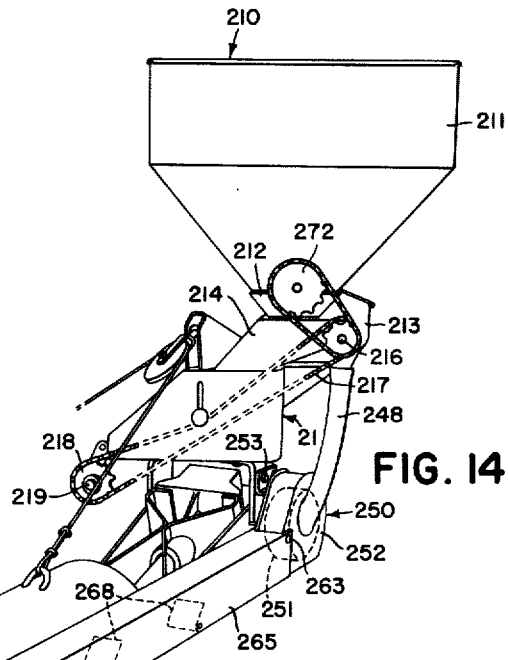
FIG. 14 is a fragmentary view of the fertilizer spreader and associated parts.

The tilling unit 10 includes a generally rectangular framework 31, FIG. 12, that is made up of front and rear bars 32 and 33, and segmental end plates 34 (FIGS. 4 and 12) connected to the inner and outer ends of the front and rear bars 32 and 33. The laterally inner plate 34 (FIG. 12) and the bars 32 and 33 carry an arcuate enclosing hood or housing 35. The laterally inner frame plate 34 carries a pair of hinged bracket plates 36 and 37 that, with a plate 38, forms a shield and support for self aligning bearing means 41 in which the inner end of a tiller shaft 42 is supported. The outer end of the shaft 42 is supported by similar bearing means at the other end of the tiller frame 31. The shaft 42 carries a plurality of L-shaped blade or knives 45 arranged in pairs, as best shown in FIG. 12, each having generally axially extending and backwardly angled ground engaging sharpened ends 46. Each tilling element or blade 45 is connected by pairs of bolts 47 to a blade support in the form of a generally square plate 49 that is welded to the shaft 42 in circumferentially staggered relation. The shaft 42 includes a tube 51 and associated shaft ends carried in the bearings 41. Thus, the rotor or tiller member includes a plurality of knives or teeth that are evenly spaced angularly about the axis of the shaft 42 and spaced axially of one another so as to permit staggered contact with the ground. It will be seen from FIG. 12 that the axially turned portions 46 are overlapped and angled backwardly to prevent trash and the like wrapping on the knives, and the outwardly extending tooth portions on the end knives pass through an anti-wrapping devices 53 (FIG. 12) that shears off vines and the like before they start to wrap around the rotor shaft. Specifically, the anti-wrapping device 53 comprises a U-shaped member providing a pair of stationary sections 55 and 56 that cooperate with the knife ends. The anti-wrapping device is secured by bolts 58 to the adjacent frame member 33. A covering member 60 (FIG. 17) is provided with a weight W and is hinged, as at 61, to the frame bar 33 between the skids 63 and serves to hold the fertilizer and soil in place and smooth the ground. The member 60 extends substantially from end to end of the tilling unit 10. At each end of the unit 10 there is a ground engaging skid 63 connected to the associated tiller frame end plate 34 by uprights 64 apertured to receive connecting bolt means 65 (FIGS. 1 and 14).

The laterally inner tiller shaft end portion 42a, as best shown in FIG. 4, is connected to one member 68 of a universal joint unit 69, the other member which is connected to a short shaft 71, and the latter carries similar universal joint means 72. The means 69, 71 and 72 form a double universal joint shaft means that serves to connect the rotor shaft 42 with the outer squared end 74 of an output shaft 75. The latter forms a part of a bevel gear unit 77 that is fixed to and supported by an interconnecting frame unit 80 that swingably connects the tiller unit 10 with the U-shaped bracket 26.

Figure 15:
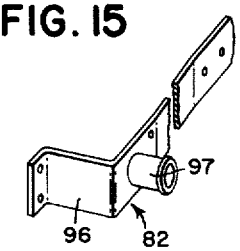
FIG. 15 is a detail perspective view of one of the support frame bars.

The interconnecting or supporting frame 80 serves as a support for the bevel gear unit 77 and includes a pair of front and rear outer support frame members 81 and 82, the laterally outer ends of which are apertured to receive a pair of pivots 84 disposed in axially alined relation (FIG. 2) and pivotally or swingably connecting the support frame 80 with the hinge brackets 36 and 37 of the tilling unit 10. The support frame 80 also includes a pair of front and rear inner members 86 and 87. As best shown in FIGS. 2 and 4, these members are substantially identical and have central portions shaped to engage one another as indicated at 89, FIG. 4, and which are rigidly interconnected, as at 91, FIG. 1. The outer ends of the members 86 and 87 are apertured to receive the associated pivots 84, and the opposite or inner ends of the parts 86 and 87 are shaped to extend inwardly as shown in FIG. 4 and are apertured to receive bolts 93 or other suitable fastening means by which the inner ends of the members 86 and 87 are connected to flanges formed on a bevel gear housing section 95 that serves as a gear enclosing portion of the bevel gear unit 77. The laterally inner ends of the front and rear bars 81 and 82 of the support frame 80 are formed with inwardly bent portions 96 (FIG. 4) that are connected together at 100 and embrace the housing section 95. At its inner end each of the frame bars 81 and 82 is provided with an outwardly extending tubular portion or sleeve 97 (FIG. 15) that is rockably or hingedly received in upper and lower bearing caps 98 and 99 (FIG. 2). The upper caps 98 are carried by the end portions of the U-shaped member or bracket 26. The lower bearing caps 99 are bolted to the upper caps 98, as best shown in FIG. 1 at 99a. In the form of the invention shown in FIGS. 2 and 4, the lower bearing caps 99 are carried by control rod anchoring arms 101 that are clamped in mating fashion with the upper bearing caps 98 by cap screws 103 screwed into tapped openings formed in the adjacent portions of the associated link-anchoring arms 101. Thus, the bearing caps 98 and 99 form bearing means connecting the supporting frame 80 with the bracket 26 for generally vertical swinging movement relative to the tractor 11. The portion 95 of the bevel gear housing 77 encloses the usual bevel gears (not shown), one of which is mounted on the inner end of the shaft 75 (FIG. 4), the other bevel gear being mounted generally centrally on a generally fore and aft extending shaft 111, the ends 111a and 111b of which extend fore and aft out of the housing 77, FIG. 4, through but not contacting the sleeves 97. Thus, the housing 77 is carried directly on the support frame 80 but no supporting stresses are imposed on the shaft 111.

From FIG. 2, it will be observed that the laterally inner portions of the inner frame members 86 and 87 are not only bolted at 93 to the housing portion 95 but also are bolted, as at 93a, to the adjacent portions of the front and rear support frame bars 81 and 82. The drive is transmitted from the power take-off shaft 19 at the rear of the tractor to the rear of the bevel gear housing shaft 111 by the following means.

A spur gear housing 120 (FIG. 6) is fixed in a suitable way to the rear portion of the tractor 11 and encloses a pair of intermeshing spur gears 121 and 122, the gear 121 being connected in any suitable way with the power take-off shaft 19 of the tractor. It will be seen from FIGS. 3 and 6 that the lower portion of the housing 120 extends below the adjacent portion of the tractor. Included in the lower portion of the housing 120 is a forwardly extending sleeve section 123 (FIG. 3) through which a shaft section 124 extends. The shaft section 124 is connected at its rear end to the spur gear 122 and at its forward end to a universal joint 126 to which the rear end of a shaft 127 is connected. The shaft 127 is in telescopic association with the companion tubular shaft 128, the forward end of which is connected by a second universal joint 129 to a slip clutch unit 131. The latter is connected to the rear end of the bevel gear input shaft end 111b, FIG. 4. The slip clutch unit 131 protects the tiller driving mechanism against overloads, and the universal joint and shaft means 126–129 accommodates disposition of the tilling unit 10 in different angular positions horizontally relative to the tractor. As mentioned above, the bolts 25, placed in selected openings, fix the U-shaped bracket 26 in the proper positions to place the tilling unit 10 either extending laterally outwardly or extending laterally and rearwardly, as indicated generally by the full and dotted lines in FIG. 4.

From FIG. 18 it will be seen that in the dotted line position of the drive parts, which corresponds to the rearwardly angled position of the tilling unit 10, the front and rear universal angles a and b are the same, and likewise in the full line position, the front and rear angles a' and b' are the same. Similarly, the inner and outer universal joint angles at the universals 69 and 72 are the same in the different vertical positions of the tilling unit 10. When in the rearwardly angled position, as shown for example in FIG. 14, the outermost end of the tiller unit 10 is disposed generally at or adjacent a point directly outwardly of the tractor rear wheels. The shaft sections 127 and 128 telescope when making the change between the full line position and the dotted line position (FIG. 4).

In order to protect the universal joint and shaft means, which lies generally below the rear axle of the tractor, from being damaged from collision with objects on the ground, there is provided, according to this invention, a pair of telescopically associated bar members 136 and 137 (FIG. 3), the former being pivotally connected as at 138, to a bracket member 139 that is connected by a U-bolt 141 to the associated spur gear housing sleeve 123. The bar 137 is pivoted at 140 to a bracket member 143 that is fixed in any suitable way to the associated portion of the rear arm 101 on the U-shaped bracket 26 (FIG. 2). It will be seen from FIG. 3 that the pivots 138 and 140 are disposed in alignment with the centers of the universal joint axes so that the horizontal adjustment of the tilling unit relative to the tractor is accommodated while retaining the protection afforded by the telescopically associated bars 136 and 137.

The tilling unit 10 is normally operated in the horizontal ground engaging position shown in FIGS. 1, 2 and 7 with both skids 63 supporting the unit 10 on the surface of the ground. The unit 10 is permitted to float generally vertically relative to the tractor by virtue of the swingable connection provided by the support frame 80 and its connection with the tractor carried bracket 26 and the hinge arms 36 and 37 of the tilling unit 10. In the form of the invention shown in FIG. 1, the downward movement of the support frame 80 relative to the tractor is limited by a chain 150 that is connected between a bracket 151 on the frame 80 and swivel and bracket means 152 on the adjacent portion of the tractor carried supporting member 21.

Figure 13:
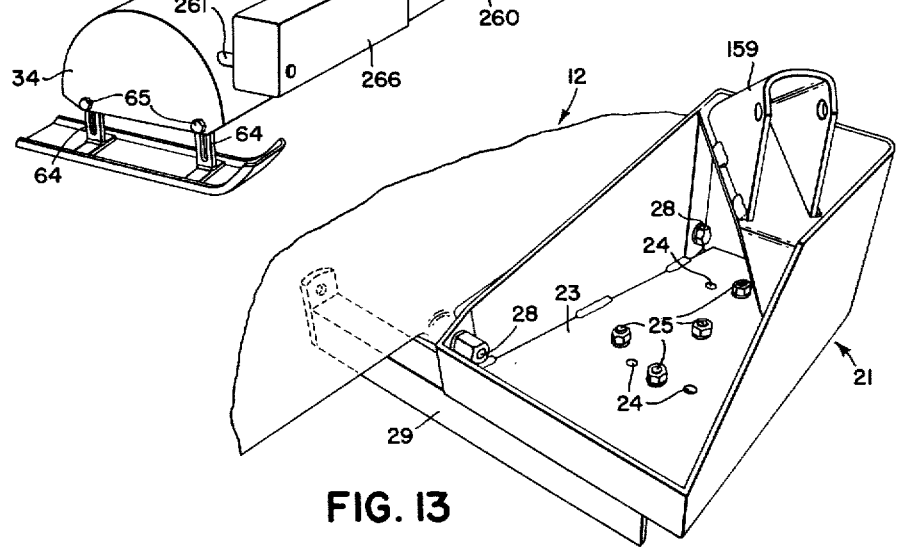
FIG. 13 is a perspective view of the tractor carried support member on which the fertilizer hopper is mounted and to which the tiller unit is swingably connected.

The tilling unit 10 is raised and lowered by a cable 155 (FIG. 1), the outer end of which is connected to a U-shaped anchoring member 156 that is secured, as by welding, to the tiller housing 35. The cable 155 extends over a sheave 157 (FIG. 1) that is swivelly connected with a cable anchor bracket 159 that is fixed to and forms a part of the supporting member 21, as best shown in FIG. 13. From the sheave 157 the cable 155 extends rearwardly over a sheave 161 that is journaled at the forward end of the generally fore and aft extending sheave bracket 163 (FIGS. 1 and 5), which preferably is made up of a pair of bars 164 and 165 (FIGS. 5 and 6) suitably interconnected in laterally spaced apart relation and fixedly mounted by bolts 167 on the lower portion of the associated drive housing of the tractor, as best shown in FIG. 5. A third sheave 169 at the rear of the sheave bracket 163 receives the cable 155, and from the sheave 169 the cable 155 extends upwardly over a fourth sheave 171 supported in a sheave frame 172 that is fixed by connectors 173 to the right hand power lift arm 17 of the tractor. From the sheave 171, the cable 155 is anchored or dead ended to the rear end of the sheave bracket 163. A slightly different form of sheave frame is shown at 172a in FIG. 6, one which provides for vertical adjustment of the sheave 171. Thus, when the tractor power lift mechanism is operated to raise the lift arms 17, the cable 155 is shifted at a doubled rate and exerts an upwardly and laterally inwardly directed pull on the tiller unit 10, as will be clear from FIG. 1.

When the chain limit means 150 of FIG. 1 is employed, the first or initial lifting movement imparted by the cable 155 to the tilling unit 10 acts to rock the latter generally upwardly about the inner skid 63 as a fulcrum. Since the pivots 84 are located laterally inwardly of the inner skid 63, this initial rocking movement imparted to the tilling unit 10 results in a lowering of the outer end of the support frame 80 until the chain 150 becomes taut and downwardly swinging of the support frame 80 is thus limited. Continued lifting action of the lifting cable 155 on the tilling unit 10 then results in swinging of the latter relative to the now stationary support frame 80 about the axis defined by the pivots 84 until stop ends 170 on the hinge brackets 36 and 37 come into contact with adjacent portions of the support frame 80. These portions may be, for example, bushings 200 (FIG. 10) carried on the lower bolts 172 that connect the laterally outer ends of the inner support frame bars 86 and 87 with the front and rear outer support frame bars 81 and 82. At this time further upward movement of the unit 10 relative to the support frame 80 is terminated, and then continued lifting action exerted by the cable 155 on the tiller unit 10 serves to raise the unit 10 and the support frame 80 together as a whole relative to the tractor about the axis defined by the sleeves 97 and the rockable or swingable connection of the inner end of the support frame 80 with the tractor. This construction provides means whereby partial actuation of the tractor power lift means serves to raise the rotor or tilling unit 10 clear of the ground for movement from tree to tree, for example. Completion of the power lift action serves to swing the tiller unit 10 generally into a substantially vertical position for road transport close alongside the tractor. So far as the raising action is concerned, FIG. 2 shows a modified form of stop means that may be substituted for the stop chain 150 so as to secure an improved lifting action.

Referring now to FIG. 2, which shows the form of this invention that utilizes the stop link anchoring arms 101 mentioned above, a pair of lost motion link units 180 are connected between the laterally outer ends of the bracket-supported arms 101 and upper portions of the hinge plates 36 and 37 above the axis, as defined by the pivots 84, of their connection with the support frame 80. Each lost motion unit comprises a pair of laterally outer and inner control rod members 181 and 182, and each control rod member 181 includes a tubular section 183 and a short rod section 184 that is pivotally connected, as by a cross rod 185 with the hinge plates 36 and 37 of the tilling unit 10. The tubular sections 183 slidably receive the corresponding portions of the other control rod members 182, the latter having turned ends, as indicated at 187, pivotally disposed in associated apertures formed in the outermost ends of the arms 101. A stop shoulder 188 is formed on each control rod member 182, but in the normal operating position, FIG. 2, when the unit 10 is horizontally supported on the ground by the skids 63, the laterally inner ends of the tubular sections 183 are spaced an appreciable distance from the associated stop shoulders 188.

In this form of the invention, referring now to FIGS. 7-11, when a lifting effort is exerted through the lift cable 155 on the tilling unit 10, the latter is first raised at its outer end by rocking the unit 10, as in the form shown in FIG. 1, about the laterally inner skid 63 as a fulcrum, the cable 155 in each form being connected with the housing 10 at a point that lies laterally outwardly of the center of gravity of the tilling unit 10 and the support frame 80 and associated parts, taken as a whole.

The upward swinging of the tiller unit 10 about the inner skid 63 continues until the parts reach the position shown in FIG. 8, at which time the laterally inner end of the sleeves or tubular sections 183 engage the stops 188. At this point, further lifting action exerted on the unit 10 by the cable 155 then acts to swing the unit 10 upwardly in a path of movement that is determined by the location of the pivot points 84, 111, 187 and 185, FIGS. 8 and 9. Beginning substantially at the position shown in FIG. 8, the cable 155 acts to raise the unit 10 bodily but without any great amount of angular displacement of the unit 10, as will be seen by comparing the positions of the unit 10 in FIGS. 8 and 9. This angular displacement is accelerated when the unit is raised about to the position shown in FIG. 10, at which time extensions 170 on the hinge brackets 36 and 37 engage the bushings 200 (FIG. 10) on the frame bolts 172. At this point the unit 10 and the supporting frame 80 become rigid with respect to one another and then the final lifting action takes place with the unit 10 and the frame 80 moving as a whole about the axis defined by the bearing sleeves 97, which is the axis of swinging movement between the frame 80 and the tractor supported unit 26.

As a result of the particular arrangement of the control rods 180 and associated parts just described, the initial raising movements of the unit 10, such as are illustrated in FIGS. 8 and 9, are fairly slow and, moreover, entail only a relatively small amount of angular displacement of the unit 10. Thus the lift is fairly flat. This result is achieved by virtue of the fact that the control rods 180 are normally almost in line with the bracket-carried arms 101 during the initial lifting action. However, as the lift cycle continues, the tilling unit 10 is raised at a relatively faster rate until the unit 10 is in an almost vertical position, FIG. 11. The engagement of the hinge bracket extensions 170 with the supporting frame 80 serves to limit the angular displacement of the universal joint means 69, 71, 72 (FIG. 4) so that the individual universal joints 69 and 72 never exceed a 30° displacement. Thus, the tiller rotor may be driven throughout the entire lifting cycle so that to raise and lower the tilling units it is not required to stop the rotor drive. As will be seen by comparing FIGS. 10 and 11, after the bracket extensions 170 engage the bushings 200, further lifting action causes the control rods 180 to extend, the tubular sections 183 moving away from the stops 188.

Figure 16:
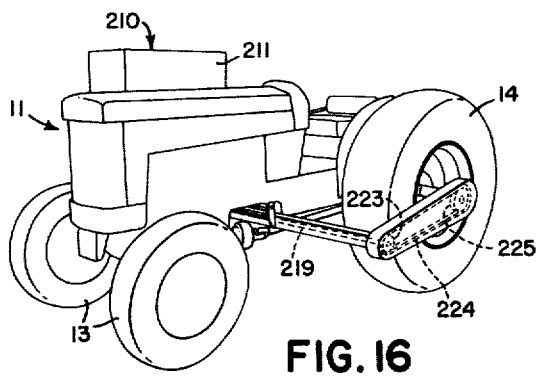
FIG. 16 is a side view of the tractor, showing the fertilizer drive.

According to this invention, a fertilizer unit 210 is adapted to be mounted on the tractor 11 and is provided with new and improved means for discharging directly in front of the tilling unit 10 whereby action of the latter unit serves to fully intermingle the fertilizer with the tilled soil. Referring now to FIGS. 1 and 14, the fertilizer unit 210 comprises a hopper 211 that includes a bottom casting 212 to the forward portion of which a discharge spout 213 is connected. The unit 210 is supported on the tractor by means of a bracket 214 that is bolted directly to the supporting member 21. The hopper 211 and associated fertilizer dispensing means carried within the hopper bottom 212 are substantially like that shown in the patent to Cook et al. 2,695,734, issued November 30, 1954. Briefly, the fertilizer dispensing means includes an endless belt mounted on and carried by a pair of rollers (not shown), one of which is fixed to a shaft 216 actuated by a chain 217 from a drive pinion 218 carried on a drive shaft 219 supported in transverse position on the tractor. An idler 221 is adjustably carried by the outer wall of the support member 21 and serves to keep the drive chain 217 taut. The shaft 219 extends from the right side of the tractor, across the same and outwardly at the left side, as indicated in FIG. 16, where the shaft 219 is provided with or carries a pinion 223 driven by a chain 224 trained over a sprocket 225 carried by the left hand tractor drive wheel 14. The right hand portion of the shaft 219 is provided with a disconnect clutch 228 (FIG. 1) and the latter is operated by a rearwardly extending rod 229 (FIG. 5) that is pivoted on a pin 231 carried by a plate member 232 that is rockable on a stub shaft 233 carried by the rear portion of the bracket 163 fixed to the tractor, as at 167. The outer or rear end of the arm 232 is provided with a slot 234 in which a stud 235 is movable. The stud is adjustably fixed to the lower end of the generally upwardly extending link 237 that at its upper end is pivoted, as at 238, to the sheave support 172 (FIG. 5). By virtue of the construction just described the clutch 228 is disconnected whenever the power lift arms 17 are raised to raise the tilling unit, and the clutch is engaged whenever the lift arms are lowered. Thus, the fertilizer drive is disconnected automatically when the unit 10 is raised so that the fertilizer dispensing means is rendered active when the tiller is lowered and inactive whenever the tilling unit 10 is raised. The slot 234 is provided so as to permit a certain amount of movement of the lift arm 17 in the lowered position without disconnecting the fertilizer drive.

Returning to the fertilizer attachment 210, fertilizer is delivered by the endless belt mentioned above into the spout 213. The amount of fertilizer so dispensed is controlled by a slide 245 fixed in different positions of adjustment by a clamping member 246, FIG. 1. Fertilizer from the spout 213 flows downwardly through a flexible tube 248 of any suitable construction and at the lower end enters a spreader 250. As best seen in FIG. 14, the spreader 250 comprises a spreader wheel 251 and a wheel housing 252 fixed rigidly, as at 253, to the angularly adjustable U-shaped bracket 26. To this end the bracket 26 carries a pair of bolt-receiving holes 254 (FIG. 1).

A transverse distributor housing 260 (FIG. 14) forms a part of the fertilizer distributor and is pivotally connected, as at 261, at its outer end to the outer end portion of the tilling unit 10, and at its inner end the spreader unit 260 is pivoted, as at 263, to the discharge end of the wheel housing 252. The distributor housing 260 is made up of two telescopically associated parts 265 and 266 and these parts move relative to one another when the tiller is raised and lowered, for the connection point 261 shifts relative to the wheel housing 252 when the tiller unit 10 is raised and lowered. The distributor housing 260 is open at the lower portion, and the housing parts 265 and 266 are provided with baffles 268 arranged so as to provide for substantially uniform distribution of the fertilizer, discharged thereto by the spreader wheel unit 250. The spreader wheel 251 is arranged to be connected directly to the forward end 111a of the shaft 111, FIGS. 1, 2, and 4, and to this end the shaft 111 is apertured, as at 269 (FIG. 2) to receive means fixing the spreader wheel 251 to the shaft 111. To aid in the support of the fertilizer attachment to the supporting member 21, the former carries a triangular bracket 270 (FIG. 1). Also, suitable agitating means within the hopper 211 is actuated by a sprocket 272 driven from a sprocket 273 on the shaft 216 by a drive chain 274.

The operation of this implement is believed to be clear from the above description. Briefly, the tilling unit 10 floats on the inner and outer skids 63 in operating position, the floating action being permitted by the swingable connection of the supporting frame 80, with, first, the tractor carried bracket 26 and, second, the hinged brackets 36 and 37 of the unit 10. The rotor 42 (FIG. 12) is driven from the power take-off shaft of the tractor, the drive being transmitted through a universal joint and shaft means that is so arranged as to accommodate disposing the unit 10 in different angular positions, as shown in FIG. 4. The change in angular position of the unit 10 is made by fixing the U-shaped bracket 26 in different positions to the main support member 21, the latter being fixed to the right side of the tractor. The rotation of the tilling member is controlled by the usual power take-off control member 280 on the tractor.

The spreader wheel 251 operates, not as a blower, but more as a fertilizer projecting member that, in cooperation with the baffles 268, distributes the fertilizing material throughout the length of the spreader housing 260 but without blowing or dissipating the fertilizer material into the air. Instead, the fertilizer drops to the ground which is immediately tilled by the rotor knives, and the fertilizer and loosened soil is smoothed and held in place by the rear covering board 60, which leaves a smooth finished surface. It will be noted, particularly from FIGS. 1 and 14, that the tiller unit 10 provides a low profile implement, the housing 35 protecting the tree from being damaged by the knives. The working depth of the latter may be controlled by raising when lowering the shoes 63 relative to the housing 35. The baffles 268 may be adjusted by any suitable means, as desired, to secure proper and uniform fertilizer placement. The cutting edges of the knives, as shown at 46, are angled backwardly, with the result that trash and the like does not tend to cling or hairpin over the cutting edges.

When the tilling unit 10 is set in a rearwardly angled position, the unit is arranged for working around trees in a generally circular direction and the outermost end of the tiller unit lies substantially in line with the rear wheels of the tractor, whereby maneuvering the outfit is greatly facilitated. When driving in a straight line, as along a row, the preferred position of the unit 10 is one extending generally directly outwardly from the tractor.

While I have shown and described above the preferred structure in which the principles of this invention have been incorporated, it is to be understood that my invention is not to be limited to the particular details shown and described above, but that, in fact, widely different means may be employed in the practice of the broader aspects of my invention.

What I claim, therefore, and desire to secure by Letters Patent is:

1. A tree hoe attachment for a fore and aft extending farm tractor having a power take-off shaft at the rear, said tree hoe comprising a supporting member fixedly carried by the tractor forward of said power take-off shaft, a rotary tilling unit disposed generally transversely of the tractor, a support frame swingably connected at one end with the inner end of said tilling unit and swingably connected at the other end with said supporting member for movement about a generally fore and aft extending axis, means interconnecting said power take-off and said tilling unit for driving said tilling unit from said power take-off shaft, including a shaft disposed on the fore and aft extending axis of swinging of said support frame relative to said supporting member, a fertilizer hopper mounted on said supporting member, means including a wheel fixed to said shaft for receiving granular fertilizer from said hopper and directing it to points in front of said tilling unit, and a distributor housing carried at least partially on said tilling unit and extending to said wheel to receive fertilizer therefrom, said housing having a discharge opening in its lower portion.

2. A power driven hoe attachment for a fore and aft extending propelling tractor including frame means and power take-off means carried thereby, said power driven hoe comprising a ground tilling unit, a supporting member fixedly carried by the tractor, said tilling unit including a gear box support frame supported at one end for rocking movement on said supporting member about a generally horizontal axis, means to drive said tilling unit from the tractor power take-off means and including a bevel gear box carried by said frame, a drive shaft disposed in said axis, means interconnecting said power take-off with said drive shaft, and means connecting said drive shaft with said tilling unit, a fertilizer hopper carried by said supporting member, and granular fertilizer distributing means receiving fertilizer from said hopper and including a wheel housing fixed to said supporting member and enclosing the forward end of said drive shaft, a distributor wheel fixed to said shaft, and a distributor housing pivoted on said tilling unit and said supporting member and receiving fertilizer from said wheel.

3. A power driven hoe attachment for a fore and aft extending propelling tractor having power take-off means, said hoe comprising a ground tilling unit, rotary means disposed in said ground tilling unit, means including a shaft interconnecting said power take-off means with said rotary means for driving said rotary means from said power take-off means, a fertilizer hopper carried by the tractor, and means for delivering granular fertilizer from said hopper to points in front of said tilling unit, including a wheel fixed to said tiller driving shaft, a wheel housing carried by the tractor and enclosing said wheel, and an open bottom fertilizer distributor housing connected with said tilling unit and said wheel housing to receive fertilizer discharged into the distributor housing by said wheel.

4. A tree hoe attachment for a farm tractor of the type having frame means and a power take-off shaft at the rear of said frame means, said tree hoe comprising a generally laterally extending tilling unit including a tilling unit frame means, a rotary shaft carried thereby, shaft means disposed generally transversely relative to said rotary shaft and connected to drive said rotary shaft, adjustable means mounting said transversely disposed shaft means on said tractor forwardly and to one side of said power take-off shaft and accommodating two different angular positions of said transversely disposed shaft means relative to the tractor, and driving means connecting said transverse shaft means with said tractor power take-off shaft and including a generally fore and aft extending drive shaft, telescopic shaft means, a rear universal joint between said drive shaft and said telescopic shaft means, and a front universal joint between said telescopic shaft means and said transversely disposed shaft means, said adjustable means being arranged so that the front and rear universal joint angles are the same in either of said positions of said tilling unit.

5. An agricultural implement, adapted to be mounted on a tractor having a power take-off shaft, said implement including a rotor adapted to be driven from said power take-off shaft; drive means for said rotor, said drive means including a bevel gear housing having a shaft extending outwardly at opposite sides thereof, bevel gear means in said housing, means interconnecting said power take-off shaft with said bevel gear means, and means connecting said bevel gear means with said rotor; a support for said housing comprising frame means fixed to said bevel gear housing and including a pair of tubular bushings fixed to opposite sides of said frame means and encircling but spaced from the shaft of said bevel gear housing, and means on the tractor rockably receiving said bushings so as to accommodate rocking of said bevel gear housing and said support frame means.

6. The combination with a tractor having power lift means and a frame, of a ground working implement extending generally laterally outwardly relative to the frame of the tractor and having an inner end portion and an outer end portion, an interconnecting frame disposed between the inner end portion of said implement and the adjacent side portion of the tractor, said interconnecting frame having laterally inner and outer end portions, means swingably connecting the laterally inner and outer end portions of said interconnecting frame with said implement and said side portion of the tractor, respectively, for relative movement about generally fore and aft extending axes, stop abutments carried at the inner end portion of the implement and engageable with adjacent portions of said interconnecting frame, a pair of outwardly extending arms fixedly carried by the tractor and disposed above said interconnecting frame, and a lost motion link unit connected between each arm and said implement.

7. The invention set forth in claim 6 in which said lost motion link comprises a laterally outer control rod, a laterally inner control rod, one of said control rods including a tubular section telescopically receiving the adjacent portion of the other control rod, pivot means connecting the inner end of the laterally inner control rod to said arm, means pivoting the outer end of the laterally outer control rod to said ground working implement, and means limiting the laterally inward movement of said tubular section relative to said other control rod.

8. A power driven hoe attachment for a propelling tractor including laterally spaced apart rear wheels, frame means, and a power take-off shaft means carried thereby, said power driven hoe comprising a generally laterally extending ground working unit, generally laterally disposed support frame means having an inner end portion and an outer end portion, means connecting said ground working unit with the outer end portion of said support frame, a support member, means securing said support member to the frame forward of the power take-off shaft, said support member having a generally horizontal wall provided with two sets of apertures, a generally fore and aft extending hanger comprising a generally U-shaped member having spaced apart generally horizontal intermediate section having an apertured section, the apertures of which are adapted to register with one or the other of said sets of apertures in said support member to provide for attachment of said hanger to said support member in two optional positions, means swingably securing the inner end portion of said support frame means to said hanger whereby when the hanger is in one position said ground working units extends laterally outwardly substantially at right angles to the tractor and when the hanger is in the other position said ground working unit extends laterally outwardly and rearwardly, the length of said ground working unit being such that when the latter is in its rearward position the outer end of said ground working unit lies substantially in line with the rear wheels of the tractor, means mounted on the tractor for raising and lowering said ground working unit in either of its positions, and means interconnecting said power take-off and said ground working unit for driving said ground working unit from the tractor power take-off in either of said positions.

9. A tree hoe attachment for a farm tractor of the type having frame means and a power take-off shaft disposed generally centrally of the tractor at the rear of said frame means, said tree hoe comprising a support member having a generally horizontal wall provided with two sets of apertures, means fixing said support member to one side of the tractor frame means forward of the power take-off shaft, a generally fore and aft extending hanger comprising a generally U-shaped member having spaced apart generally downwardly extending end portions and a generally horizontal intermediate section having an apertured section, the apertures of which are adapted to register with one or the other of said sets of apertures in said support member to provide for attachment of said hanger to said support member in two optional horizontally angled positions, a tilling unit swingably connected with said hanger for generally vertical movement and adjustable horizontally relative to said support member with said hanger, and means to drive said tilling unit from said power take-off shaft, said last mentioned means comprising a generally fore and aft extending drive shaft, telescopic shaft means, a driven shaft forward and to one side of the drive shaft, and universal joints between said shafts extending between said centrally disposed power take-off shaft and said tilling unit, the lateral position of said support frame relative to the power take-off shaft being such that the universal joint angles are substantially the same in either position of the adjustable hanger.

10. A tree hoe attachment for a farm tractor of the type having frame means and a power take-off shaft at the rear of said frame means, said tree hoe comprising a support member having a generally horizontal wall provided with two sets of apertures, means fixing said support member to one side of the tractor frame means forward of the power take-off shaft, a hanger comprising a generally U-shaped member having spaced apart end portions and an intermediate section having an apertured section, the apertures of which are adapted to register with one or the other of said jets of apertures in said support member to provide for attachment of said hanger to said support member in two optional positions, a tilling unit swingably connected with said hanger and adjustable relative to said support member with said hanger, and means to drive said tilling unit from said power take-off shaft, said tilling unit including a gear box support frame supported for rocking movement on the end portions of said hanger about a generally horizontal axis, a bevel gear box carried by said frame and including a drive shaft disposed in said axis, and said tilling unit drive means including shaft means connected between one end of said drive shaft and said power take-off shaft.

11. A tree hoe attachment for a farm tractor of the type having frame means and a power take-off shaft at the rear of said frame means, said tree hoe comprising a support member having a generally horizontal wall provided with two sets of apertures, means fixing said support member to one side of the tractor frame means forward of the power take-off shaft, a hanger comprising a generally U-shaped member having spaced apart end portions and an intermediate section having an apertured section, the apertures of which are adapted to register with one or the other of said sets of apertures in said support member to provide for attachment of said hanger to said support member in two optional positions, a tilling unit swingably connected with said hanger and adjustable relative to said support member with said hanger, and means to drive said tilling unit from said power take-off shaft, said tilling unit including a rotor housing, a tilling rotor journaled in said housing, a support frame pivotally connected at its outer end with the laterally inner end of said rotor housing, means pivotally supporting the inner end of said support frame on said hanger for movement relative thereto about a generally fore and aft extending axis, a gear housing, means fixing said housing to said support frame, a shaft supported in said gear housing and disposed in said fore and aft extending axis, means to drive the latter shaft from the tractor power take-off shaft, and means connected with said latter shaft to drive said tilling rotor.

12. In an agricultural implement, adapted to be mounted on a tractor having a power take-off shaft and including a rotor adapted to be driven from said power take-off shaft, means for driving said rotor including a bevel gear housing having a shaft extending outwardly at opposite sides thereof, a support for said housing comprising frame means fixed to said bevel gear housing and including a pair of tubular bushings fixed to opposite sides of said frame means and encircling but spaced from the shaft of said bevel gear housing, means on the tractor rockably receiving said bushings so as to accommodate rocking of said bevel gear housing and said support frame means, bevel gear means in said housing, means interconnecting said power takeoff shaft with said bevel gear means, said means connecting said bevel gear means with said rotor, said means on the tractor rockably receiving said bushings comprising a support member fixed to the tractor, a generally U-shaped bracket having arms and means carried thereby to rockably receive said bushings, and means fixing said bracket to said support in different positions relative thereto.

References Cited in the file of this patent

UNITED STATES PATENTS

| | | |
|---|---|---|
| 1,729,073 | Johnston | Sept. 24, 1929 |
| 2,237,504 | Roath | Apr. 8, 1941 |
| 2,520,117 | Cieslak | Aug. 29, 1950 |
| 2,539,174 | Baideme | Jan. 23, 1951 |
| 2,603,172 | Haas | July 15, 1952 |
| 2,669,919 | Freeman | Feb. 23, 1954 |
| 2,700,263 | Goss | Jan. 25, 1955 |
| 2,748,679 | Rogers | June 5, 1956 |
| 2,771,829 | Sahlbom | Nov. 27, 1956 |
| 2,777,272 | Smith | Jan. 15, 1957 |
| 2,871,804 | Pounds | Feb. 3, 1959 |
| 2,974,469 | Smith | Mar. 14, 1961 |
| 2,974,616 | Pawela | Mar. 14, 1961 |
| 3,012,371 | Pawela | Dec. 12, 1961 |

FOREIGN PATENTS

| | | |
|---|---|---|
| 555,004 | Italy | Jan. 17, 1957 |

UNITED STATES PATENT OFFICE
CERTIFICATE OF CORRECTION

Patent No. 3,092,053            June 4, 1963

Kenneth L. Kirkpatrick

It is hereby certified that error appears in the above numbered patent requiring correction and that the said Letters Patent should read as corrected below.

Column 11, line 48, for "jets" read -- sets --; column 12, line 38, for "said", first occurrence, read -- and --.

Signed and sealed this 24th day of December 1963.

(SEAL)
Attest:
ERNEST W. SWIDER

Attesting Officer

EDWIN L. REYNOLDS

Acting Commissioner of Patents